(12) United States Patent
Zhao et al.

(10) Patent No.: US 6,782,154 B2
(45) Date of Patent: Aug. 24, 2004

(54) ULTRAFAST ALL-OPTICAL SWITCH USING CARBON NANOTUBE POLYMER COMPOSITES

(75) Inventors: Yiping Zhao, Troy, NY (US); Yuchuan Chen, Troy, NY (US); Xi-Cheng Zhang, Latham, NY (US); Nachiket R. Raravikar, Troy, NY (US); Pulickel M. Ajayan, Clifton Park, NY (US); Toh-Ming Lu, Loudonville, NY (US); Gwo-Ching Wang, Loudonville, NY (US); Linda S. Schadler Feist, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 103 days.

(21) Appl. No.: 10/074,937

(22) Filed: Feb. 12, 2002

(65) Prior Publication Data

US 2002/0176650 A1 Nov. 28, 2002

Related U.S. Application Data

(60) Provisional application No. 60/267,999, filed on Feb. 12, 2001.

(51) Int. Cl.[7] .................................................. G02B 6/35
(52) U.S. Cl. .......................... 385/16; 385/122; 524/495
(58) Field of Search .................... 385/16, 122; 524/495

(56) References Cited

U.S. PATENT DOCUMENTS

| 4,983,325 A | 1/1991 | Choe et al. |
|---|---|---|
| 5,079,594 A | 1/1992 | Mitsuyu et al. |
| 5,148,505 A | 9/1992 | Yanagawa et al. |
| 5,472,777 A | 12/1995 | Kineri et al. |
| 5,588,083 A | 12/1996 | Boonstra et al. |
| 5,714,304 A | 2/1998 | Gibbons et al. |
| 5,993,701 A | 11/1999 | Ando et al. |
| 6,228,977 B1 | 5/2001 | Kanitz et al. |
| 2002/0050769 A1 * | 5/2002 | Pelrine et al. ............... 310/363 |
| 2002/0068170 A1 * | 6/2002 | Smalley et al. ............. 428/403 |
| 2002/0171901 A1 * | 11/2002 | Bernstein .................... 359/199 |
| 2002/0175408 A1 * | 11/2002 | Majumdar et al. .......... 257/734 |
| 2003/0133637 A1 * | 7/2003 | Bao et al. ....................... 385/2 |

OTHER PUBLICATIONS

"Buckytubes: A New Additive for Plastics," www.cnanotech.com/5-0_buckytube_properties_uses.cfm, (Jan. 25, 2002).

S. G. Lee et al., "Subpicosecond Switching in a Current Injected GaAs/AlGaAs Multiple–Quantum–Well Nonlinear Directional Coupler," Appl. Phys. Lett. 64, pp. 454–456 (Jan. 24, 1994).

J. Paye and D. Hulin, "Monochromatic All–Optical Gate with 1 ps Response Time," Appl. Phys. Lett. 62, pp. 1326–1328 (Mar. 22, 1993).

(List continued on next page.)

Primary Examiner—John D. Lee
Assistant Examiner—Sung Pak
(74) Attorney, Agent, or Firm—RatnerPrestia

(57) ABSTRACT

An ultrafast all-optical nonlinear switch. The switch has as components a substrate and a material disposed on the substrate. In one embodiment, the material includes a plurality of single-walled carbon nanotubes and a polymer forming a composite. Preferably, the polymer is polyimide. In another embodiment, the material includes a plurality of single-walled carbon nanotubes incorporated into a silica. The nanotube loading in the material is less than about 0.1 wt %. The material is a substantially transparent, third-order nonlinear optical material. The switch has a switching speed of less than 1 picosecond for light with a wavelength of about 1.55 micrometers. Also disclosed is a process for preparing the ultrafast all-optical nonlinear switch.

12 Claims, 7 Drawing Sheets

OTHER PUBLICATIONS

R. Takahashi et al., "Ultrafast 1.55 µm All–Optical Switching Using Low–Temperature–Grown Multiple Quantum Wells," Appl. Phys. Lett. 68, pp. 153–155 (Jan. 8, 1996).

Y., Nishikawa et al., "All–Optical Picosecond Switching of a Quantum Well Etalon Using Spin–Polarization Relaxation," Appl. Phys. Lett. 66, pp. 839–841 (Feb. 13, 1995).

S. Nakamura et al., "Experimental Investigation on High–Speed Switching Characteristics of a Novel Symmetric Mach–Zehnder All–Optical Switch," Appl. Phys. Lett. 65, pp. 283–285 (Jul. 18, 1994).

M. Asobe, "Nonlinear Optical Properties of Chalcogenide Glass Fibers and Their Application to All–Optical Switching," Optical Fiber Technology 3, Article No. OF970214, pp. 142–148 (1997).

M. Bronikowski et al., "Gas–Phase Production of Carbon Single–Walled Nanotubes from Carbon Monoxide Via the HiPco Process: A Parametric Study," J. Vac. Sci. Technol. A 19, pp. 1800–1805 (Jul./Aug. 2001).

H. Zhu et al., "Direct Synthesis of Long Single–Walled Carbon Nanotube Strands," Science, May 3, 2002.

* cited by examiner

ULTRAFAST ALL-OPTICAL SWITCH USING CARBON NANOTUBE POLYMER COMPOSITES

RELATED APPLICATION

This application claims priority based upon U.S. Provisional Patent Application Serial No. 60/267,999, filed on Feb. 12, 2001, the disclosure of which is incorporated in this application by reference.

TECHNICAL FIELD

The present invention relates generally to switching optical path lines in an optical communication system and, more particularly, to an ultrafast, high-sensitivity, waveguide, all-optical switch, made from single-walled carbon nanotube (SWNT) polymer composites, having a switching speed of less than 1 picosecond (ps) for light with a wavelength of about 1.55 micrometers ($\mu$m).

BACKGROUND OF THE INVENTION

The continued development of optical communications requires fast information processing. Therefore, ultrafast, all-optical systems for basic processing at both ends of an optical transmission line are replacing electronic systems. The advantages of all-optical systems include the avoidance of repeated conversions between electrical and optical signals and the faster speed of optical devices over their electronic counterparts.

The reliability and economy of an optical communication network using optical fibers cannot be fully realized by simply connecting two distant components through the optical fibers. Therefore, to further enhance reliability and economy, attempts have been made to improve the availability of the optical fibers by providing an optical switch or switches in the optical fibers. Optical switches function to switch optical information to a standby line, detour around obstacles, or switch optical information to an unused line.

Mechanical optical switches are one type of optical switch used in optical communication systems. Mechanical optical switches function to switch the optical paths by mechanically moving optical components such as the optical fibers. This type of optical switch has a number of drawbacks. The switching speed is low, on the order of millisecond (ms), and the number of switches possible is limited by wear of the parts caused by the mechanical switching operations.

A semiconductor waveguide optical switch is another type of optical switch used in optical communication systems. Semiconductor waveguide optical switches have a switching speed on the order of nanoseconds (ns) and are free from wear. An optical switch having an X-junction optical waveguide shown in FIG. 1 is known in the prior art and is described in U.S. Pat. No. 5,148,505 issued to Yanagawa et al.

As shown in FIG. 1, thin semiconductor layers of a predetermined composition are sequentially laminated as a lower clad layer, a core layer, and an upper clad layer on a semiconductor substrate 51 to form optical waveguides 52 and 53 in a ridge configuration. Optical waveguides 52 and 53 intersect each other in the shape of the letter "X," with a branch angle of θ degrees, to form a junction point or branch point 54. The entire surface of the structure is covered with a thin insulation film. An electrode 55 is used to inject a current of a predetermined value to the optical waveguides which intersect at the branch point 54.

Portions 52a and 53a of the optical waveguides 52 and 53 which lie on one side of the optical waveguides with respect to the branch point 54 constitute input ports, respectively, and the portions 52b and 53b on the opposite side of the branch point 54 constitute output ports, respectively. With the optical switch of the construction shown in FIG. 1, when a predetermined amount of current is injected via the electrode 55, the refractive index of that portion of the core layer into which the current is injected is lowered by the action of the injected carriers. As a result, light waves incident on the input port 53a are subjected to total reflection at the interface between the current injection area and the non-injection area and then transmitted from the output port 52b to the exterior. On the other hand, when no current is injected via the electrode 55, light waves incident on the input port 53a pass straight through the branch point 54 and are transmitted from the output port 53b to the exterior.

Thus, the light waves incident on the input port 53a are transmitted from the output port 52b or 53b depending on whether a current is injected via the electrode 55 or not. In this way, the optical switch of FIG. 1 performs the switching operation.

A branching interference-type modulator shown in FIG. 2 is known as another example of an optical switch. The modulator combines Y-junction optical waveguides of the type shown in FIG. 3. As shown in FIG. 3, each of the Y-junction optical waveguides is constructed by sequentially laminating thin semiconductor layers of a predetermined composition as a lower clad layer, a core layer, and an upper clad layer on a semiconductor substrate 61 to form an optical waveguide 62. The optical waveguide 62 includes a main optical waveguide 62a as an input port for light waves and two output optical waveguides 62b and 62c branching from the main optical waveguide 62 at a predetermined branch angle (θ).

Assume that the cross sections of the main input optical waveguide 62a and the output optical waveguides 62b and 62c are the same. Then, the light waves incident on the main input optical waveguide 62a are transmitted outwardly from the output optical waveguides 62b and 62c as light waves of the equal light outputs. More specifically, the light waves of the light output "2" incident on the main input optical waveguide 62a are equally divided and then transmitted out from the output optical waveguides 62b and 62c as light waves of light output "1."

As shown in FIG. 2, the output optical waveguides 62b and 62c of one Y-junction optical waveguide are respectively connected to the input optical waveguides 62b' and 62c' of the other Y-junction optical waveguide. Electrodes 63a and 63b are respectively formed on the connecting portions of the waveguides. A predetermined voltage can be applied to the electrodes 63a and 63b. With the modulator, light waves incident on the main input optical waveguide 62a are equally divided by the output optical waveguides 62b and 62c. In this case, for example, because the guided light propagating from the output optical waveguide 62c to the optical waveguide 62c' is subjected to the phase shift according to the voltage applied via the electrode 63a, the guided light is combined or interfered with the guided light propagating from the output optical waveguide 62b to the optical waveguide 62b'. As a result, the light output of the light wave transmitted from the main optical waveguide 62a' varies according to the phase difference between the guided light propagating through the optical waveguide path 62c–62c' and the guided light propagating through the optical waveguide path 62b–62b'.

In the case of the branching interference type-modulator, the mode interference of the light waves propagating through the optical paths is used. For this reason, the light output of the light waves to be transmitted depends on the polarization and wavelength of the light waves to be propagated. Accordingly, this type of modulator can be properly operated only for the guided light of a specified polarization and a specified wavelength.

Ultrafast, all-optical switches are crucial for future, high-bit-rate, time-division-multiplexing optical communication systems or free-space, optical-digital, computing systems. So far, many types of ultrafast, all-optical switches have been studied and demonstrated using optical nonlinearities in optical fibers and semiconductor materials. Such devices must satisfy several requirements. They must be compact and, in this respect, semiconductor devices are preferable to optical fiber devices. In addition, they should be independent of polarization and, in this respect, normal-incident devices are preferable to waveguide devices. In the normal-incident devices, however, large optical nonlinearities are needed because the interaction length is small.

The nonlinear optical properties of active semiconductor waveguides have proven to be of great interest in terms of their possible application to high-speed devices, including subpicosecond optical switches. In semiconductor optical devices, the optical nonlinearity usually comes from the excitation of real or virtual carriers by a strong control (pump) beam. Much work has been directed to ultrafast and low-energy switching in a current injected GaAs/AlGaAs nonlinear material. See, e.g., J. Paye and D. Hulin, "Monochromic all-optic gate with 1 ps response time," Appl. Phys. Lett. 62, 1326 (1993); S. Lee, B. McGinnis, R. Jin, J. Yumoto, G. Khitrova, H. Gibbs, R. Binder, S. Koch, and N. Peyghambarian, "Subpicosecond switchingin a current injected GaAs/AlGaAs multiple-quantum-well nonlineardirectional coupler," Appl. Phys. Lett. 64, 454 (1994); and R. Takahashi, Y. Kawamura, and H. Iwamura, "Ultrafast 1.55 $\mu$m all-optical switching using low-temperature-grown multiple quantum wells," Appl. Phys. Lett. 68, 153 (1996). The GaAs-based material is expensive and cannot be integrated into silicon-incorporating structures.

Although the generation of real carriers can induce a large optical nonlinearity in semiconductor devices, the device performance is limited by the long (nanoseconds) recovery time. Off-resonance excitation in the optical Stark effect regime (which is a coupling between the electric field of light and the energy levels of the material) has a subpicosecond response, but it requires a very high switching intensity (typically, a few Gigawatts/cm$^2$) and suffers from an accompanying long-lasting recovery component due to the generation of real carriers by one- or two-photon absorption. In both cases, large loss is another limiting factor because the wavelength of light must be close to the semiconductor absorption-band edge in order to achieve a large optical nonlinearity.

Due to the limits imposed by the properties of the materials used for the existing all-optical switches, the fastest speed of all-optical switches is around 1 picosecond at the optical communication wavelength of about 1.55 $\mu$m. In addition, the fabrication process of some existing ultrafast optical switches is not compatible with the current silicon technology. Therefore, if one can find a faster nonlinear material with similar structure but easy to incorporate into the integrated system, one can improve the speed of the optical communication as well as reduce the price of the device.

To overcome the shortcomings of existing all-optical switches, a new all-optical switch is provided. An object of the present invention is to provide an improved all-optical switch made of a faster nonlinear material with similar structure to existing materials. It is still another object of the present invention to provide an optical switch in which the switching operation is not mechanically affected and, therefore, wear is not caused by the switching operation and the switching speed is high.

A related object is to provide a third-order nonlinear optical material having unique properties and a process for production of such material. More specifically, it is an object of the present invention to provide a material which excels in processability and has a higher relaxation speed as compared with conventional materials. A further object of this invention is to provide a third-order nonlinear optical material satisfying certain requirements, namely: (1) large third-order nonlinear susceptibility; (2) high transparency (small absorption) in the operating optical communication wavelength range of about 1.55 $\mu$m; and (3) high relaxation speed. Another object of the present invention is to provide a material for an improved all-optical switch that can be incorporated easily into integrated systems and, especially, is compatible with silicon-incorporating structures. Another object of the present invention is to provide a material for an improved all-optical switch that is cost-competitive with existing switch materials. Still another object of the present invention is to provide a third-order nonlinear optical material comprising readily available raw material components, preventing restrictions on manufacture.

SUMMARY OF THE INVENTION

To achieve these and other objects, and in view of its purposes, the present invention provides an ultrafast all-optical nonlinear switch. The switch has as components a substrate and a material disposed on the substrate. In one embodiment, the material includes a plurality of single-walled carbon nanotubes and a polymer forming a composite. Preferably, the polymer is polyimide. In another embodiment, the material includes a plurality of single-walled carbon nanotubes incorporated into a silica. The nanotube loading in the material is less than about 0.1 wt %. The material is a substantially transparent, third-order nonlinear optical material. The switch has a switching speed of less than 1 picosecond for light with a wavelength of about 1.55 micrometers. Also disclosed is a process for preparing the ultrafast all-optical nonlinear switch.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
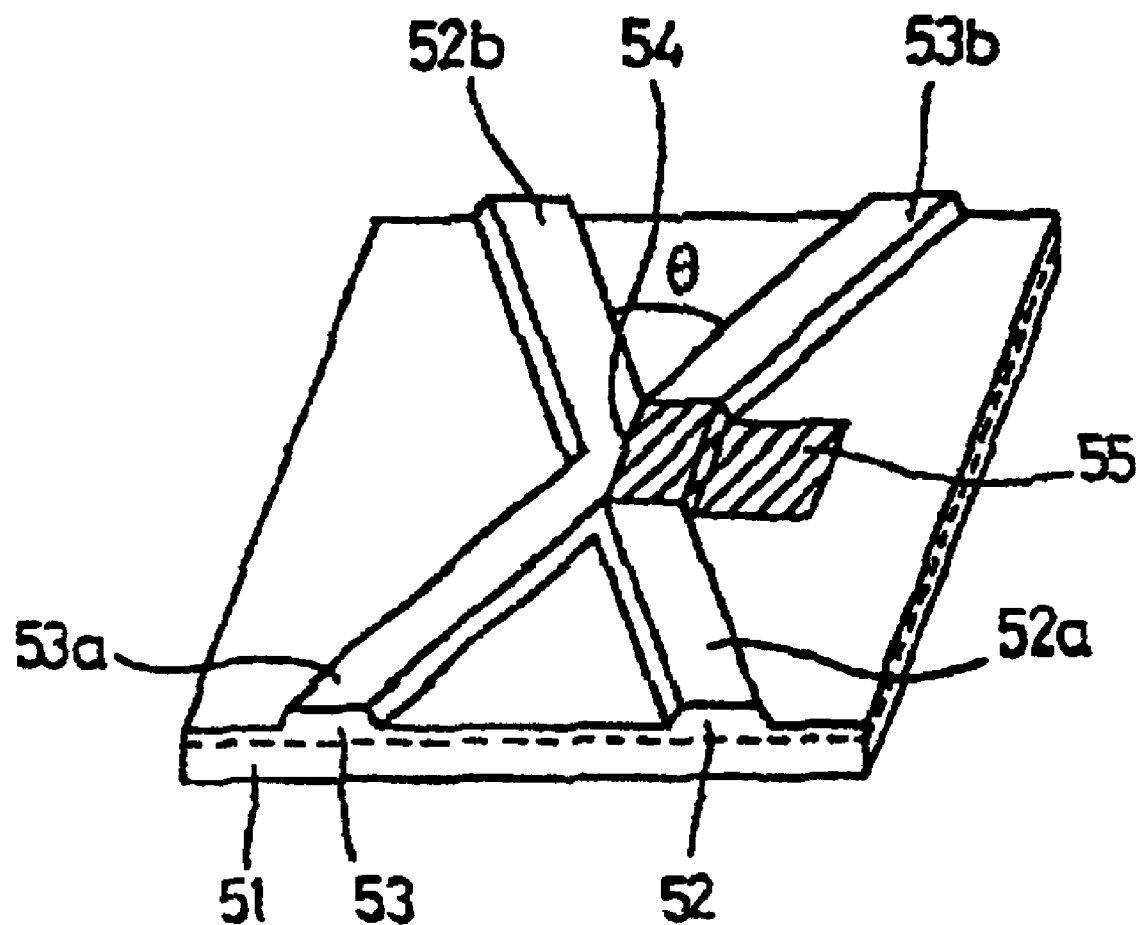
FIG. 1 is a schematic perspective view of the conventional X-junction guided-wave optical switch.
Figure 2:
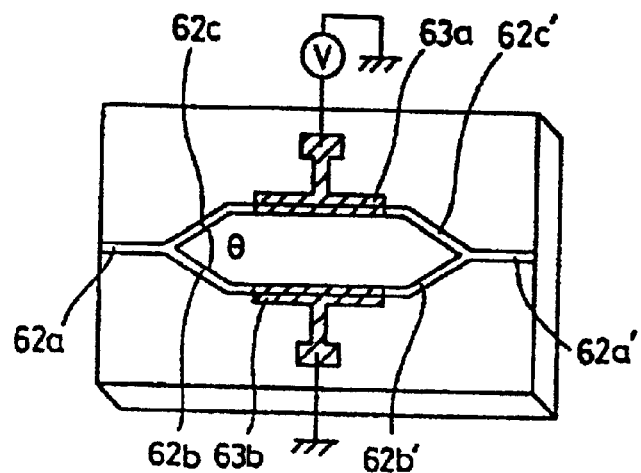
FIG. 2 is a schematic plan view showing the conventional branching interference type modulator.
Figure 3:
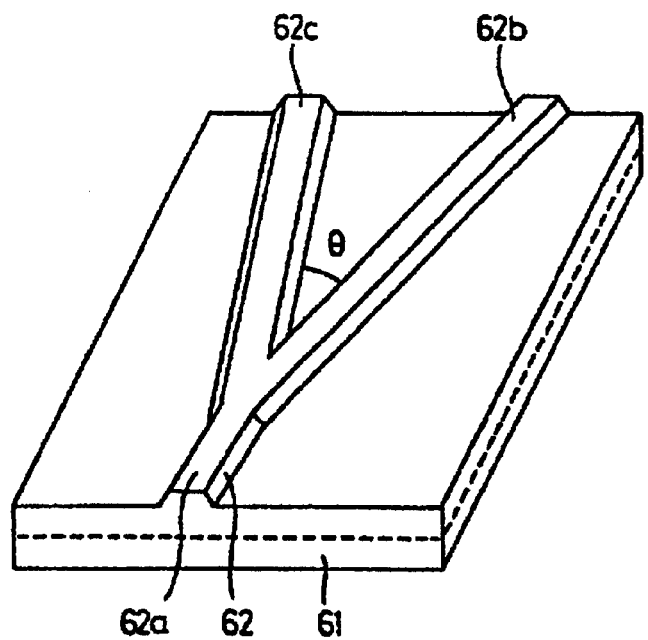
FIG. 3 is a schematic perspective view of a conventional Y-junction optical waveguide used in the modulator illustrated in FIG. 2.

The present invention is an ultrafast, high-sensitivity, all-optical switch made from single-walled carbon nanotube (SWNT)-polymer composites. The switch uses the nonlinear optical property of SWNT, and both the turn-on time and turn-off time are less than 1 picosecond for light with a wavelength 1.55 μm. For 20 μJ/cm² pump light with the same wavelength, shining on a 0.064 mm thick film, the transmission can increase almost $2.66 \times 10^{-4}$. The SWNT-polymer composites can be easily prepared by a conventional ultraviolet (UV) curing and baking method, and can be incorporated into optical fiber systems or integrated optical systems through conventional lithography techniques.

A. Materials of Construction

SWNTs (sometimes called "buckytubes") are hollow molecules of pure carbon linked together in an hexagonally bonded network to form a hollow cylinder. The tube is seamless, with either open or capped ends, and is free of property-degrading flaws in the nanotube structure. The diameter of an individual SWNT is 0.7 to 2 nm, typically about 1.0 nm, which is about 100,000 times thinner than a human hair, about half the diameter of DNA, and about $1/10,000^{th}$ the diameter of graphite fibers. Individual tubes are about 100–1,000 nm in length, hundreds of times their diameters, giving SWNTs a very high aspect ratio. Specifically, the aspect ratio of LSWNT of a SWNT is around 100–1,000, compared with about 1 for carbon black particles. The special nature of carbon combines with the molecular structure of SWNTs to give SWNTs exceptionally high material properties such as electrical and thermal conductivity, strength, stiffness, and toughness.

SWNTs can be reacted and manipulated using the rich chemistry of carbon. Thus, a SWNT gives the user an opportunity to modify the structure and to optimize solubility and dispersion. The material characteristics of the SWNT give the SWNT potential in numerous applications, including use as filler in thermoplastics and thermosets. In fact, SWNTs naturally form a morphology that is ideal for conductive filler applications. SWNTs self-assemble into "ropes" of tens to hundreds of aligned tubes, running side by side, branching and recombining. When examined by electron microscopy, it is exceedingly difficult to find the end of any of these ropes. Thus, ropes form naturally occurring, long, conductive pathways that can be exploited in making electrically conductive filled composites. Additional information about SWNTs can be obtained from Carbon Nanotechnologies, Incorporated of Houston, Tex. (www.cnanotech.com).

A wide variety of polymer materials are suitable for use in the formation of the SWNT-polymer composites of the present invention. Table I lists many suitable polymer materials. The listed examples are included to more clearly demonstrate the overall nature of the invention. These examples are exemplary, not restrictive, of the invention. Polyimide is especially preferred for use in the composite material of the present invention, especially because polyimide polymers have long been used to fabricate optical waveguides on chips.

TABLE I

Optical Properties of Selected Polymer Waveguide Component Materials

| Polymer Material | Index | Straight Guide Transmission Loss (dB/cm at wavelength) | Processing temperature (° C.) | Maximum exposure temp. (° C.) | Comments |
|---|---|---|---|---|---|
| Polycarbonate | 1.59 | 0.2 (0.83 μm) | 200 | 200 | |
| PMMA | 1.49 | 0.2 (0.85 μm) | | 80 | |
| Polystyrene | 1.59 | | | 90 | |
| Polyurethane | 1.56 | 0.8 (0.85 μm) | | 100 | |
| Photopolymerizable acrylate | 1.46–1.52 | <0.2 (0.63–0.9 μm) | | | Sensitive to oxygen |
| Benzocyclobutene | 1.5–1.55 | 1 | | 350 | Process w/CF$_4$ |
| Preimidized polyimide | 1.62 | 0.3 (0.83 μm) | | | |
| Polyimide mixtures | 1.65 | 1.5 | | 250 | |
| Polyetherimide | 1.61–1.65 | 0.23 (0.83 μm) | | | Stable |
| Polysiloxane | 1.53–1.535 | <0.2 (1.33 μm) | | 200 | Stable |
| Deuterated polysiloxane | | 0.43 (1.55 μm) | | | Stable |
| Phosphazene | 1.37–1.65; 0.633 μm | | | | |
| Poly(cyclohexylsilyne) Poly(norbornene) Polyphenylsesquisiloxane | | <0.04 | | Poor | Poor stability |
| Perfluorocyclobutene (XU 35121) Fluorinated materials | | 0.25 (1.55 μm) | | 400 | |
| Fluorinated acrylate polymers | 1.32–1.56 | <0.01 (0.83 μm) 0.07 (1.55 μm) | | 400; $T_g$ = −50° C. | Stable but sensitive to oxygen during processing |
| Fluorinated polyimide | 1.55 | <0.5 (0.63 μm) | | | |
| Photosensitive fluorinated polyimides | 1.52–1.62 | 0.3 (1.3 μm) | | 300 | |

TABLE I-continued

Optical Properties of Selected Polymer
Waveguide Component Materials

| Polymer Material | Index | Straight Guide Transmission Loss (dB/cm at wavelength) | Processing temperature (° C.) | Maximum exposure temp. (° C.) | Comments |
|---|---|---|---|---|---|
| Fluorinated polyimide copolymers | 1.52–1.62 | <0.5 (0.83 µm) | | | |
| Chloro-fluorinated polyimides (6FDA/DCB) | 1.52–1.57; 1.55 µm | <0.4 (1.55 µm) | | 350 | |

The ultrafast switch and decay times achieved by the all-optical switch of the present invention are intrinsic properties of the SWNT used in making the switch. Therefore, improvement of the quality of the material may be desirable depending on the requirements of a particular switch application. An advantage of the SWNT is that such improvements are possible. First, the SWNT can be purified so that only pure SWNTs are incorporated into the composite used to form the switch. Second, because the concentration of nanotubes in the SWNT-polyimide composite material can be easily altered, and the material preparation process is relatively simple, one can tune the nanotube concentration and the thickness of the film in order to achieve optimum properties in the material. In other words, the concentration of the single-walled carbon nanotubes in the composite can be tuned to achieve predetermined properties in the composite material. (A predetermined property is one that is reasonably predictable, as opposed to random.) Normally, however, the SWNT concentration in the polymer composite is low.

The SWNT-polymer composites used to make the SWNT-polymer optical switch of the present invention offer a number of advantages. For example, because polyimide is a common material for waveguide fabrication on an integrated optical chip, a SWNT-polyimide composite can be easily fabricated onto a silicon chip. The low concentration of SWNTs in the composite material renders remote any likelihood that the SWNTs would affect the patterning process of the composite film on the silicon chip. The SWNT-polyimide composite is compatible with polyimide; therefore, it is very easy to interconnect the SWNT-polyimide switch to other optical devices on the chip by polyimide waveguides.

B. Material Preparation

The ultrafast optical response discovered to be characteristic of a SWNT renders SWNTs desirable as a material of construction for all-optical switches. A SWNT-polymer composite and, more specifically, a SWNT-polyimide composite prepared in accordance with the present invention maintains in the composite similar ultrafast optical response properties. Exemplary material preparation process steps are outlined below.

First, the SWNTs are prepared by the high-pressure carbon monoxide (HiPCO) process. See M. Bronikowski et al., "Gas-Phase production of carbon single-walled nanotubes from carbon monoxide via the HiPco process: A Parametric Study," Journal of Vacuum Science and Technology A 19, 1800–5 (2001). The HiPCO process is a gas-phase chemical vapor deposition process for growing pure SWNTs at a high production rate. SWNTs grow in high-pressure (30–50 atm), high-temperature (900–1,100° C.), flowing CO on catalyst clusters of iron. The clusters are formed in situ. Iron is added to the gas flow in the form of $Fe(CO)_5$. Upon heating, the $Fe(CO)_5$ decomposes and iron atoms condense into clusters. These clusters serve as catalytic particles upon which carbon nanotubes grow (in the gas phase) via CO disproportionation:

$$CO + CO \Rightarrow CO_2 + C \text{ (SWNT)}.$$

SWNT material up to 97 mol % purity has been produced at the rates of 450 milligrams per hour. SWNT material obtained by the HiPCO process typically contains about 1 atomic % amorphous carbon and 2–3 atomic % iron catalyst nanoparticles, present as impurities.

These SWNTs are suspended in a solvent called γ-butyrolacetone and ultra-sonicated for approximately 5 minutes. The step of sonication involves the application of mechanical ultrasound to vibrate the material. Sonication breaks and untangles the large bundles of SWNTs, uniformly dispersing and distributing the SWNTs throughout the solvent. In a separate beaker, polyimide resin is dissolved in the same solvent, γ-butyrolacetone, by sonication with the proportion of resin-to-solvent of about 1:10 by weight. The resin solution and SWNT suspension, each having γ-butyrolacetone as a common solvent, are then mixed together and sonicated to obtain a uniform distribution of nanotubes in polymer solution. Then this solution is poured into a petridish.

The solution is given a soft bake on a hot plate at 100° C. for 5 minutes and then a hard bake at 150° C. for approximately 30 minutes to remove most of the solvent. Then the petridish is kept under a UV-lamp (wavelength of about 0.405 µm, intensity of about 750 $mJ/cm^2$) for 2–5 minutes to cure the resin, in order to get polyimide. Then the composite is given a final hard bake in an oven at 250° C. for 30 minutes, in order to completely remove the retained solvent. The SWNT-polyimide composite films, having SWNT loading of less than 0.1 wt %, are then peeled off the surface of the petridish. A sharp razor blade facilitates the peeling process.

The all-optical switches of the present invention can also be fabricated by incorporating SWNT into a silica by the sol-gel process. A "sol" or hydrosol is a colloidal dispersion in a liquid. A "gel" is a colloidal suspension of a liquid in a solid, forming a jelly-like material in a more solid form than a sol. The term "sol-gel" refers to a process of making glass in which the glass is formed at low temperatures from suitable compounds by chemical polymerization in a liquid phase. A gel is formed from which glass is derived by the successive elimination of interstitial liquid and the collapse of the resulting solid residue by sintering.

There are two main techniques used to synthesize gels at room temperature. The first technique consists of a common reaction, which occurs in nature, where silica chemical species diluted in aqueous solutions condense to lead to the formation of silica network. Such a condensation may occur in various aqueous solutions depending on pH and salt concentration. Different morphologies may be obtained. For silica, the most known is the precious "opal."

The second technique to produce silica from solution corresponds to a chemical reaction involving metal alkoxides and water in an alcoholic solvent. The first reaction is an hydrolysis which induces the substitution of OR groups linked to silicon by silanol Si—OH groups. These chemical species may react together to form Si—O—Si (siloxane) bonds which lead to the silica network formation. This phase establishes a 3D network which invades the whole volume of the container. Of course, for these two syntheses, the liquid used as solvent to perform the different chemical reactions remains within the pores of the solid network. A gel is thus obtained. This two-phased material consists of shaped solid exhibiting specific properties.

The sol-gel process can be applied to incorporate SWNT into a silica. The SWNT-silica composite then can be directly put into an optical fiber for switch applications. Furthermore, by applying the lithography and lift-up techniques, one can pattern the SWNT-silica material into an integrated optical system for future communication and computing applications.

C. Nonlinear Optical Properties

Nonlinear optics concerns the interaction of light waves due to an electromagnetic field-dependent susceptibility of an optically transparent substrate. Nonlinear optical effects are observed at light intensities which are sufficiently high that the electric field of the light waves is significant in comparison with the Coulomb electric field binding the electrons in the atoms and molecules of the light-transmitting solid medium. It is known that organic and polymeric materials with large delocalized π-electron systems can exhibit nonlinear optical response, which in many cases is a much larger response than that shown by inorganic media.

The significant polarization components of a medium produced by contact with an electromagnetic field are first order polarization (linear polarization), second order polarization, and third order polarization. The fundamental concepts of nonlinear optics and their relationship to chemical structures can be expressed in terms of dipolar approximation with respect to the polarization induced in an atom or molecule by an external field:

$$\mu_\Delta = \mu_e - \mu_g = p = \alpha E + \beta EE + \gamma EEE + \ldots$$

This fundamental equation describes the change in dipole moment between the ground state, $\mu_g$, and an excited state, $\mu_e$, expressed as a power series of the local electric field, E, created by an applied electric field which occurs upon interaction of such a field, as in the electric component of electromagnetic radiation, with a single molecule.

The parameter "p" is the polarization response or total induced polarization of the molecule to the incident electric field. The coefficient α is the linear polarizability; β and γ are the quadratic and cubic hyper-polarizabilities, respectively. The coefficients for these hyper-polarizabilities are tensor quantities intrinsic to the molecule under consideration and, therefore, are highly dependent on symmetry. Odd-order coefficients are non-vanishing for all structures on the molecular and unit cell level. The even-order coefficients such as β are non-zero for those structures lacking a center of inversion symmetry on the molecular and unit cell level.

For a macroscopic ensemble of molecules, such as that arising from an array of molecules in a crystal, corresponding relationships may be expressed by the following equation:

$$P = \epsilon_0 \chi^{(1)} E + \epsilon_0 \chi^{(2)} EE + \epsilon_0 \chi^{(3)} EEE + \ldots$$

In this equation, $\chi^{(1)}$, $\chi^{(2)}$, and $\chi^{(3)}$ are the first, second, and third order polarization susceptibilities of the electromagnetic wave transmission medium, $\epsilon_0$ is the permittivity in a vacuum, P is the total induced polarization, and E is the local field created by an applied electric field. Linear optical susceptibility, $\chi^{(1)}$, is $(n_0)^2 - 1$, where $n_0$ is the linear refractive index of the material. The third-order nonlinear optical susceptibility, $\chi^{(3)}$, can be measured, for example, by z-scanning or four-wave mixing experiments and calculated from the nonlinear refractive index, $n_2$, of the material. The coefficients $\chi^{(1)}$, $\chi^{(2)}$, and $\chi^{(3)}$ are analogous to α, β, and γ, except that they describe a macroscopic assembly of molecules. On both the molecular and the macroscopic levels, the nonlinear optical properties arise from the coefficients for nonlinear polarization—i.e., β and γ at the molecular level and $\chi^{(2)}$ and $\chi^{(3)}$ at the macroscopic levels.

A significant aspect of the present invention pertains to those properties emanating from γEEE or $\chi^{(3)}$EEE, which properties are the third-order polarization effects. An improved third-order nonlinear optical material for an extremely high-speed optical switch is the subject of the present invention. The material must have certain specific qualities, for example, as (1) high third-order nonlinear susceptibility, (2) high transparency (small absorption) in the operating wavelength range of about 1.55 μm, and (3) high response speed. The term "response speed" refers to a time required for one operation in the repeated operations of the optical switch constructed using the SWNT-polyimide composite material of the present invention. Therefore, the smaller the response speed, the larger the number of operations per one second that the switch can perform.

Third-order nonlinear optical materials of various kinds have been investigated to achieve ultrafast all-optical switching for high-speed optical communications. Such materials include, for example, chalcogenide glass, tellurite, silicate, germanate, and gallate. See M. Asobe, "Nonlinear Optical Properties of Chalcogenide Glass Fibers and Their Application to All-Optical Switching," Optical Fiber Technology 3, 142–48 (1997). To obtain interaction efficiently between two different lights, it is desirable that the nonlinear optical media have high nonlinearity, high power density, and a sufficiently long interaction length. Generally, nonlinear materials can be categorized into resonant and nonresonant types. Resonant materials are used with a wavelength near the electronic absorption edges, facilitating use of the high resonant nonlinearity. The drawback to resonant materials is that the response time is limited by the carrier relaxation time or slow thermal nonlinearity. In contrast, nonresonant materials are used with a wavelength longer than the electronic absorption edge, assuring ultrafast material response due to third-order electronic polarization. The drawback to nonresonant materials is that their nonlinearity is relatively low; thus, a waveguide structure is necessary to keep a high power density within the long interaction length. The SWNT-polyimide composite material of the present invention represents an improvement over conventional materials used to form ultrafast all-optical switches.

D. Switching Properties

To determine the response time and the recovery time of the nonlinear refractive index change in the SWNT-polyimide composite optical switch of the present invention, a pump-and-probe method was used. A polarization probe pulse monitors the transmission change caused by a polarized pump pulse as a function of time delay. The variable time delay was introduced into the probe beam, which is also chopped for lock-in detection. Zero time delay is defined at the maximum switching. The time-resolved pump-probe experiment, as described below, demonstrates the excellent switch property of SWNT-polyimide composites.

Figure 4:
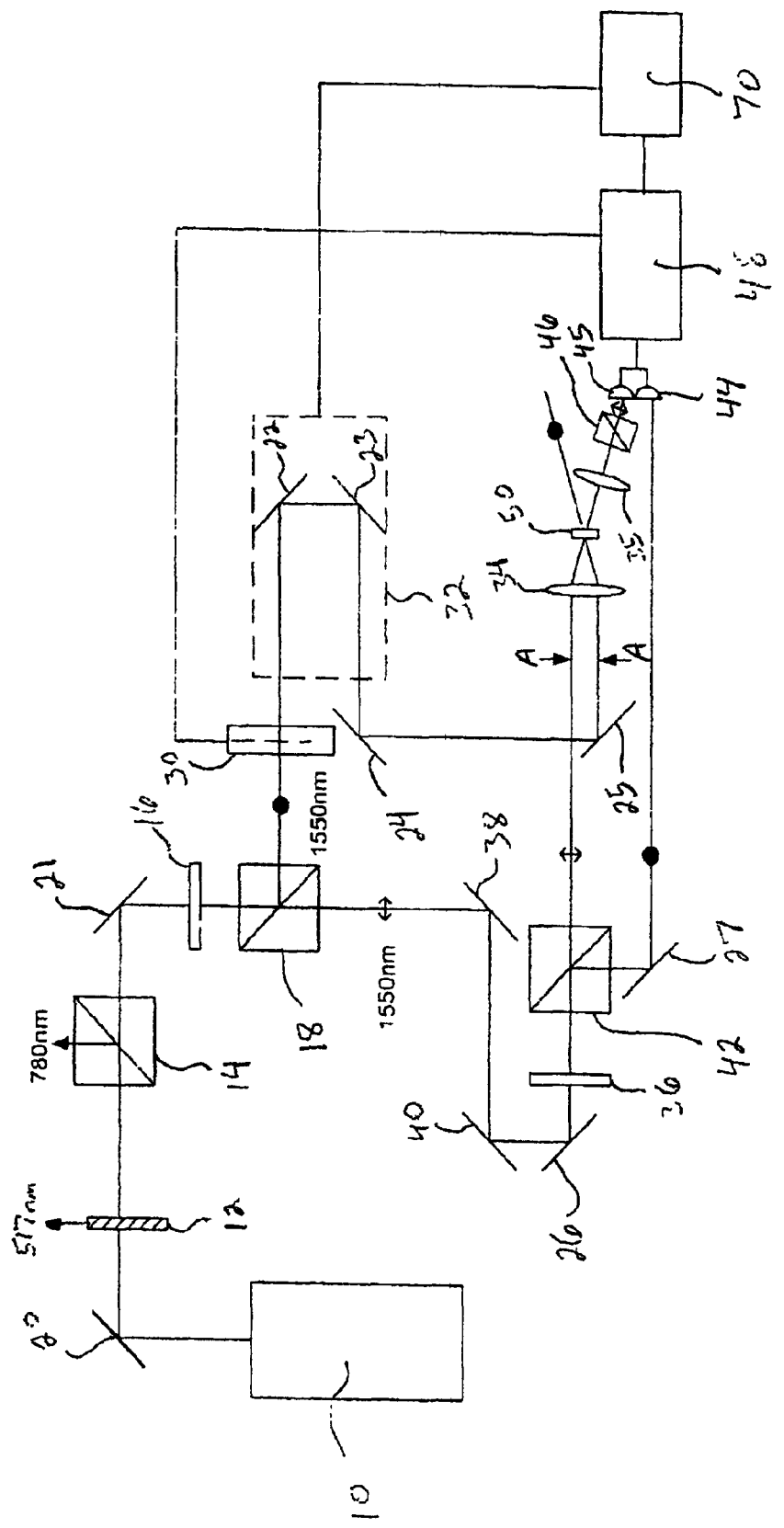
FIG. 4 shows the experimental apparatus used to conduct tests on example SWNT-polymer composite materials according to the present invention.

FIG. 4 shows the experimental apparatus 1. An IMRA™ femtosecond fiber laser and, more specifically, the IMRA™ FemtoLite 780 (available from IMRA America, Inc. of Ann Arbor, Mich.) is used as the light source 10. The laser light source 10 has three wavelengths: 1.55 µm, 0.78 µm (the second harmonic), and 0.517 µm (the third harmonic). The average optical power for 1.55 µm is about 25 mW, the repetition rate is 50 MHz, and the pulse duration is about 150 fs.

The beam from the laser light source 10 is initially directed by a first silver-coated mirror 20. The 0.517 µm beam is blocked by a green filter 12 and the 0.78 µm beam is blocked by a first polarization beam splitter 14 at 0.78 µm with an extinction ratio (Tp:Ts) of at least 500:1. The remaining, unblocked 1.55 µm beam is then redirected by a second silver-coated mirror 21.

To reduce the optical background and the coherent spike, the polarizations of the pump and the probe beams are set to be perpendicular to each other by using a first half-wavelength ($\lambda/2$) plate 16 at 1.55 µm. A second polarization beam splitter 18, with an extinction ratio (Tp:Ts) of 500:1, splits the two beams. The pump beam is modulated by a chopper 30 at a frequency of 1,700 Hz; then time-delayed with a translator 32 controlled by a computer with 0.1 µm resolution. The translator 32 consists of third and fourth silver-coated mirrors 22 and 23, respectively. After reflection by fifth and sixth silver-coated mirrors 24 and 25, respectively, the pump beam is focused into the sample 50 by a lens 34 with a focal length, f=62.9 mm. The diameter of the focal spot on the sample 50 is about 30 µm.

The probe beam is directed by a seventh silver-coated mirror 38 and an eighth silver-coated mirror 40, each having a reflection, R>98% at 1.55 µm. The probe beam is further directed by a ninth silver-coated mirror 26. To improve the signal-to-noise ratio, the probe beam is split, by using a second half-wavelength ($\lambda 2$) plate 36 at 1.55 µm and a third polarization beam splitter 42 with an extinction ratio (Tp:Ts) of at least 500:1, into two beams: a balance beam and an effective probe beam. The balance beam is reflected by an tenth silver-coated mirror 27 into an InGaAs photodetector 44. The pump beam is blocked by a polarization analyzer 46 at 1.55 µm.

The effective probe beam transmits through the third polarization beam splitter 42 and is focused by the lens 34 onto the sample 50. The effective probe beam and the pump beam reach the lens 34 in substantially parallel paths separated by a distance, A, of about 12 mm. After passing through the sample 50, the effective probe beam is refocused by a second lens 35 with a focal length, f=100 mm. The effective probe beam then passes through the polarizer 46 and into a second InGaAs photodetector 45. The differential signal from the two photodetectors 44 and 45 is measured by a lock-in amplifier 48 and is analyzed by a computer 70. By controlling the translator 32, one can scan the delay time between the pump pulse and the probe pulse, then the switch time and the decay time of the sample 50 are obtained.

An experiment was conducted using the apparatus 1 under the following conditions. The characteristics of the pump beam were: (a) wavelength of 1.55 µm; (b) power of 20 mW; (c) pulse width of about 150 fs; and (d) spot size (diameter) of 50 µm. The characteristics of the probe beam were: (a) wavelength of 1.55 µm; (b) pulse width of about 150 fs; and (c) spot size (diameter) of 50 µm. The results of the experiment are shown in FIG. 5.

Figure 5:
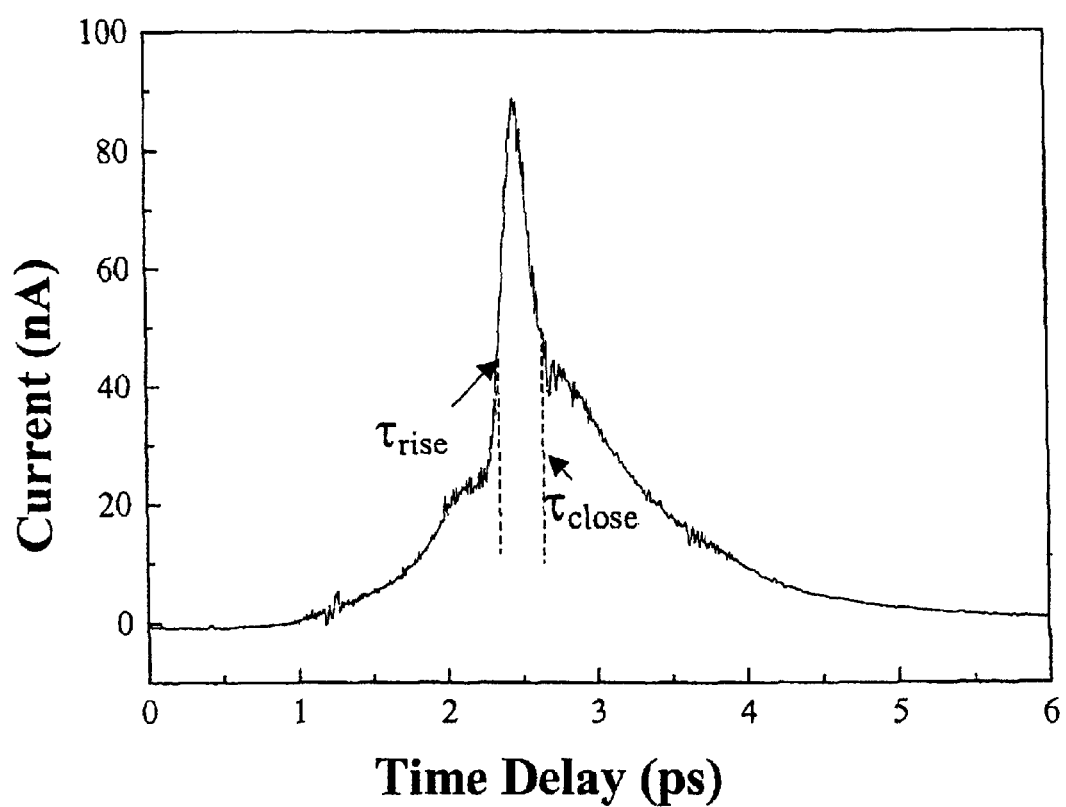
FIG. 5 is a graph illustrating the switching property of a sample SWNT-polyimide composite material according to the present invention.
Figure 6:
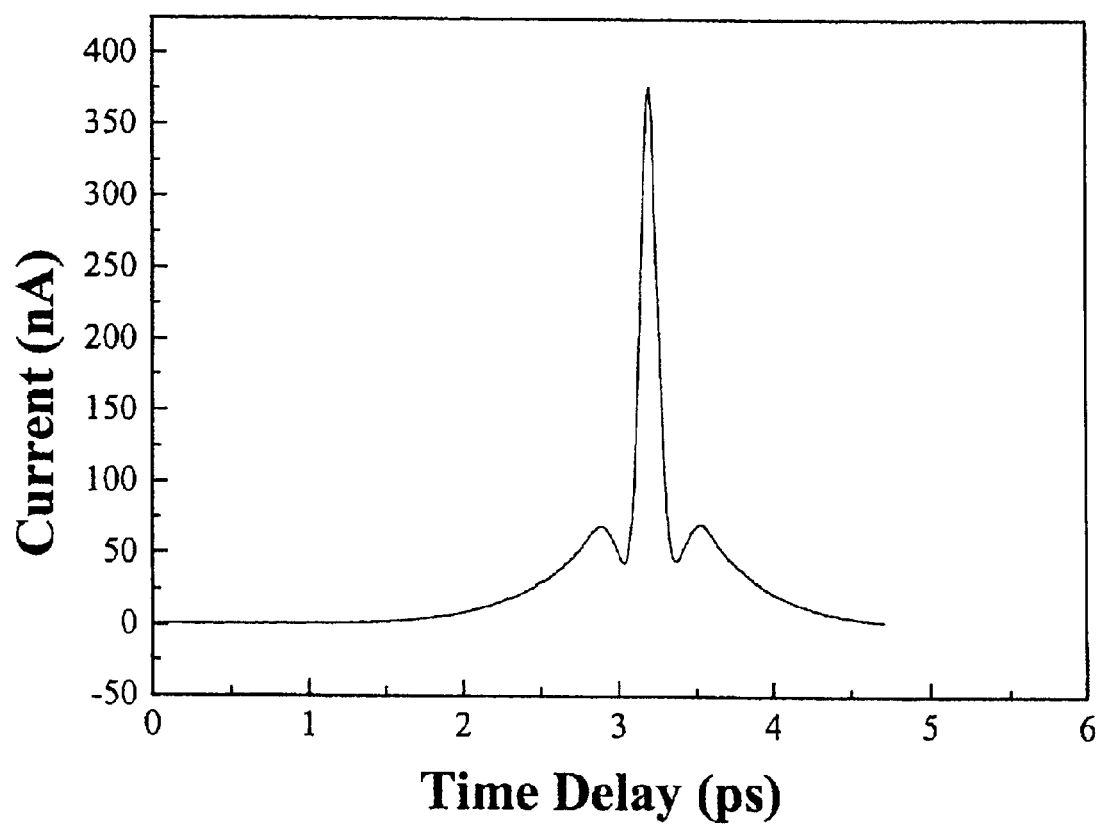
FIG. 6 is a graph illustrating the autocorrelation function of the incident pulse used in testing the sample SWNT-polyimide composite material according to the present invention.

The switch time, $\tau_{rise}$, and decay time, $\tau_{close}$, of the SWNT-polyimide composite according to the present invention are significantly less than 1 ps, as seen from the long and short, dashed, vertical lines in FIG. 5. These results are excellent for an optical switch. In fact, the sharp peak almost has the same shape as the autocorrelation function of the incident pulse, shown in FIG. 6, which indicates that the SWNT-polyimide composite material could have an even faster response. The switch time and decay time of the SWNT-polyimide composite tested are similar to those of the incident pulse; both are significantly less than 1 ps. This response is better than the responses of all known existing all-optical switches.

Figure 7:
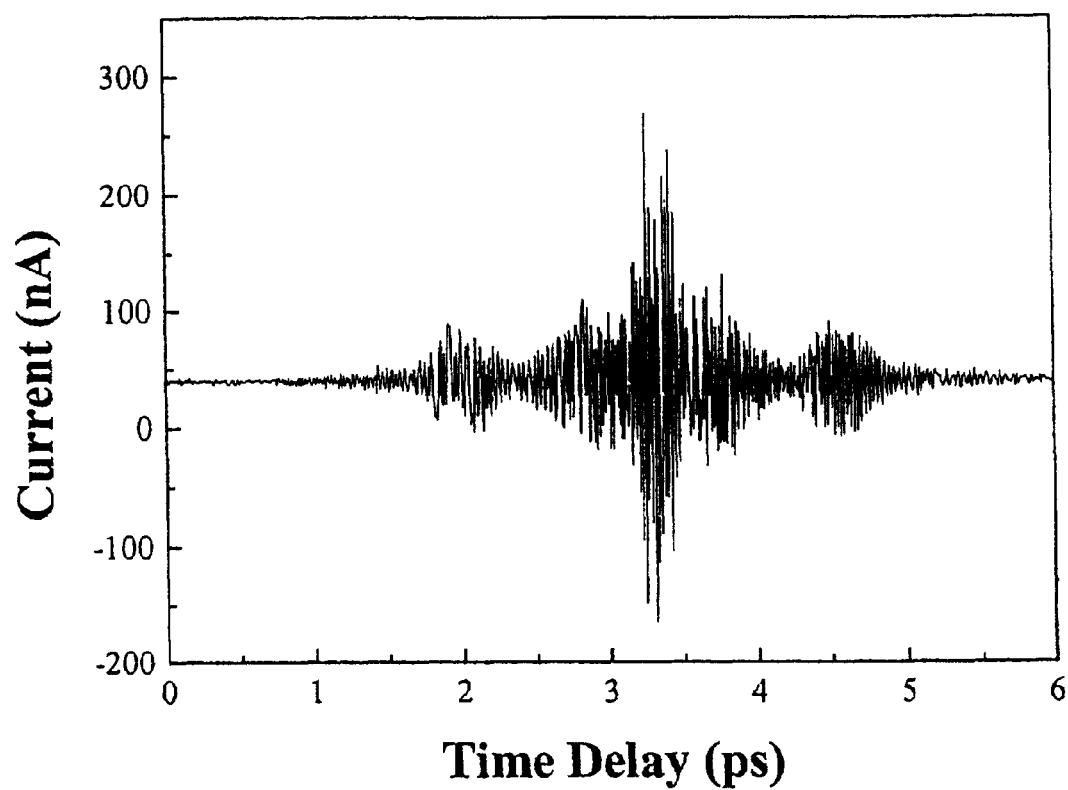
FIG. 7 is a graph illustrating the pump-probe response of a pure polyimide film.
Figure 8:
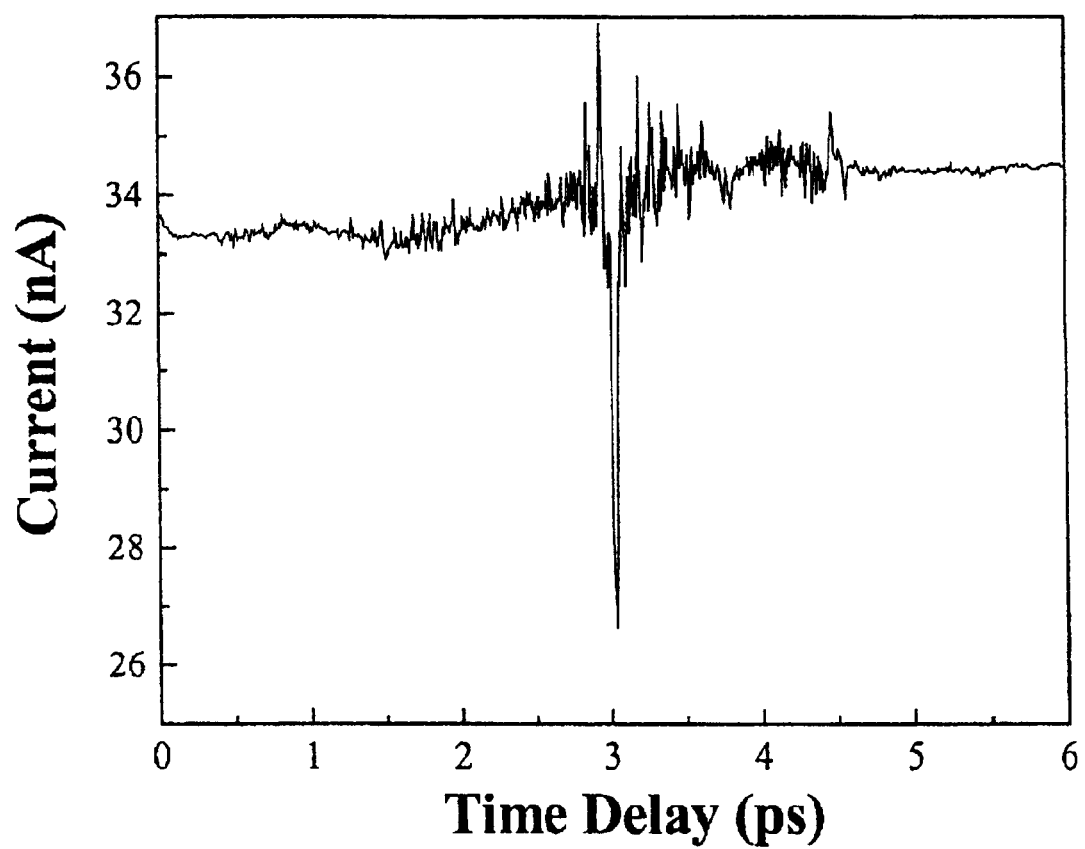
FIG. 8 is a graph illustrating the pump-probe response of a graphite powder sample.

The relative change of the transmission coefficient due to the pump, $\Delta T/T=2.6\times10^{-4}$, is also very large. In addition, experiments were conducted using a 0.78 µm pulse to pump and 1.55 µm pulse to probe the film. The results show that the sharp response disappears, and a long decay tail with a time constant of about 1 ps appears. These results demonstrate, at least indirectly, that the ultrafast response of the SWNT-polyimide composite is due to the strong third-order nonlinear properties of the SWNT. To confirm that the ultrafast switching property is due to the SWNT, the same experiments were performed on a pure polyimide film and on a graphite powder sample. The resulting pump-probe responses are shown in FIG. 7 and in FIG. 8, respectively. No switching signal appears for either the pure polyimide film of FIG. 7 or the graphite powder sample of FIG. 8.

An important consideration is the wavelength at which the optical switch of the present invention will be implemented. Long-distance communication is implemented at the low loss windows in silica fiber, about 1.31 and 1.55 µm. High-efficiency lasers have been developed for both of these wavelengths. Polymer optical fibers for distances of up to several hundred meters are designed to operate at about 0.65 µm. Low-cost, efficient, and robust lasers are available at about 0.83 µm for optical integration. Performance of hydrogenated polymers generally degrades as wavelength is increased above 0.8 µm, but may be adequate for short-distance use in the near infrared region. Taking all of these factors into consideration, including the results of the pump-probe experiments outlined above, the all-optical switch of the present invention, having subpicosecond switching behavior with complete recovery, is preferably implemented for a single-wavelength operation of about 1.55 µm.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention.

What is claimed:

1. An ultrafast nonlinear all-optical switch
   (a) a substrate; and
   (b) a materiel disposed on the substrate, the material including a plurality of carbon nanotubes and a polymer forming a composite and having nanotube loading of less than about 0.1% wt %,
   the switch having a switching speed of less than 1 picosecond for light with a wavelength of about 1.55 micrometers and being devoid of any additional electric components.

2. The material according to claim 1 wherein the material is a third-order nonlinear optical material.

3. The material according to claim 1 wherein the material is substantially transparent.

4. The material according to claim 1 wherein the polymer is polyimide.

5. A nonlinear optical material comprising a plurality of carbon nanotubes and a polymer forming a composite and having nanotube loading of less than about 0.1 wt %, the composite adapted to form an ultrafast all-optical switch devoid of any additional electric components.

6. The material according to claim 5 wherein the material is a third-order nonlinear optical material.

7. The material according to claim 5 wherein the material is substantially transparent.

8. The material according to claim 5 wherein the polymer is polyimide.

9. A nonlinear optical article comprising:
   (a) a substrate; and
   (b) the material of claim 5 disposed on the substrate.

10. The nonlinear optical article according to claim 9 wherein the article is an ultrafast all-optical switch.

11. The ultrafast all-optical switch according to claim 10 wherein the switch has a switching speed of less than 1 picosecond for light with a wavelength of about 1.55 micrometers.

12. An ultrafast all-optical nonlinear switch comprising:
   (a) a substrate; and
   (b) a material disposed on the substrate, the material including a plurality of carbon nanotubes incorporated into a silica and having nanotube loading of less than about 0.1 wt %,
   the switch being devoid of any additional electric components.

* * * * *